US011514495B2

(12) United States Patent
Pinel et al.

(10) Patent No.: US 11,514,495 B2
(45) Date of Patent: Nov. 29, 2022

(54) CREATING CUSTOM OBJECTS FROM A STATIC LIST OF OBJECTS AND TURNING THE CUSTOM OBJECTS INTO TRENDS

(71) Applicant: INTERNATIONAL BUSINESS MACHINES CORPORATION, Armonk, NY (US)

(72) Inventors: Florian Pinel, New York, NY (US); Donna K. Byron, Petersham, MA (US); Carmine DiMascio, West Roxbury, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 85 days.

(21) Appl. No.: 16/358,158

(22) Filed: Mar. 19, 2019

(65) Prior Publication Data

US 2020/0302500 A1    Sep. 24, 2020

(51) Int. Cl.
*G06Q 30/06*     (2012.01)
*G06F 40/205*    (2020.01)

(52) U.S. Cl.
CPC ....... *G06Q 30/0621* (2013.01); *G06F 40/205* (2020.01); *G06Q 30/0633* (2013.01); *G06Q 30/0643* (2013.01)

(58) Field of Classification Search
None
See application file for complete search history.

(56) References Cited

U.S. PATENT DOCUMENTS

| 5,899,502 | A   |    | 5/1999  | Del Giorno              |
|-----------|-----|----|---------|-------------------------|
| 6,646,659 | B1  |    | 11/2003 | Brown et al.            |
| 9,070,175 | B2  | *  | 6/2015  | Hurst ........... G06Q 50/12 |
| 9,483,547 | B1  |    | 11/2016 | Feller et al.           |
| 11,232,503| B1  | *  | 1/2022  | Rodriguez ..... G06Q 30/0603 |

(Continued)

FOREIGN PATENT DOCUMENTS

| CN | 201322929 Y | 10/2009 |
| CN | 102495971 A | 6/2012  |

OTHER PUBLICATIONS

C. Galuzzi, D. Theodoropoulos and K. Bertels, "Clustering method for the identification of convex disconnected Multiple Input Multiple Output instructions," 2008 International Conference on Embedded Computer Systems: Architectures, Modeling, and Simulation, 2008, pp. 65-73, (Year: 2008).*

(Continued)

*Primary Examiner* — Michelle T Kringen
(74) *Attorney, Agent, or Firm* — Caleb D. Wilkes

(57) ABSTRACT

A method, computer system, and a computer program product for generating a custom object is provided. The present invention may include extracting a plurality of constituent components from a static list of previously determined objects associated with a place of purchase. The present invention may then include receiving, from a user, one or more custom objects based on the extracted plurality of constituent components from the place of purchase. The present invention may also include generating, dynamically, a price for each of the one or more selected custom objects based on the extracted plurality of constituent components. The present invention may further include presenting, to the user, the selected one or more custom objects.

20 Claims, 6 Drawing Sheets

(56) References Cited

U.S. PATENT DOCUMENTS

| | | |
|---|---|---|
| 2001/0025279 A1 | 9/2001 | Krulak et al. |
| 2005/0065851 A1 | 3/2005 | Aronoff et al. |
| 2010/0030661 A1* | 2/2010 | Friedland .............. G06Q 30/00 |
| | | 705/26.1 |
| 2010/0292998 A1 | 11/2010 | Bodlaender et al. |
| 2011/0318717 A1 | 12/2011 | Adamowicz |
| 2012/0246007 A1 | 9/2012 | Williams et al. |
| 2013/0013383 A1* | 1/2013 | Vitti .................. G06Q 30/0207 |
| | | 705/14.16 |
| 2014/0222547 A1* | 8/2014 | Pridmore .............. H04L 67/22 |
| | | 709/204 |
| 2015/0073925 A1* | 3/2015 | Renfroe .............. G06Q 10/087 |
| | | 705/15 |
| 2015/0161912 A1 | 6/2015 | Bhattacharjya et al. |
| 2015/0199624 A1 | 7/2015 | Pinel et al. |
| 2016/0103839 A1 | 4/2016 | Mtaf et al. |
| 2016/0335686 A1 | 11/2016 | AthuluruTlrumala et al. |
| 2017/0139902 A1 | 5/2017 | Byron et al. |
| 2017/0193853 A1 | 7/2017 | Byron et al. |
| 2017/0236068 A1 | 8/2017 | Byron et al. |
| 2018/0096440 A1 | 4/2018 | Lopez et al. |
| 2019/0080384 A1* | 3/2019 | Radcliffe .......... G06Q 30/0621 |
| 2019/0295440 A1* | 9/2019 | Hadad ................. G06F 40/216 |
| 2020/0097333 A1* | 3/2020 | Jain ......................... G06F 9/52 |
| 2020/0272915 A1* | 8/2020 | Tata ..................... G06F 40/253 |

OTHER PUBLICATIONS

Byron et al., "Iterative Cognitive Assessment of Generated Work Products," Application and Drawings, Filed on Jul. 24, 2018, 34 Pages, U.S. Appl. No. 16/044,116.

Cullen, "What Do Generation Z Shoppers Really Want?," IBM Think Blog, Jan. 17, 2018, p. 1-4, https://www.ibm.com/blogs/think/2018/01/nrf-gen-z/, Accessed on Mar. 19, 2019.

Mell et al., "The NIST Definition of Cloud Computing," National Institute of Standards and Technology, Sep. 2011, p. 1-3, Special Publication 800-145.

* cited by examiner

CREATING CUSTOM OBJECTS FROM A STATIC LIST OF OBJECTS AND TURNING THE CUSTOM OBJECTS INTO TRENDS

BACKGROUND

The present invention relates generally to the field of computing, and more particularly to object customization.

In certain industries, for example, the fashion and food industries, static lists of objects are created from which customers may select one or more previously determined objects from the static list. In the restaurant industry, for example, online menus and online ordering have become commonplace depending on whether the ordered food is delivered or picked-up by the customer. The customer is, however, limited on how (if at all) food items may be customized by substitution of side dishes, entrees, or certain ingredients. In the fashion industry, for example, the options for customized clothing items at a clothing store or department store are even more limited in which a customer may have to separately design the clothing item. Regardless of the industry, the process of creating a personalized (i.e., customized) object from a static list of objects may be, at best, time and resource consuming.

SUMMARY

Embodiments of the present invention disclose a method, computer system, and a computer program product for generating a custom object. The present invention may include extracting a plurality of constituent components from a static list of previously determined objects associated with a place of purchase. The present invention may then include receiving, from a user, one or more custom objects based on the extracted plurality of constituent components from the place of purchase. The present invention may also include generating, dynamically, a price for each of the one or more selected custom objects based on the extracted plurality of constituent components. The present invention may further include presenting, to the user, the selected one or more custom objects.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
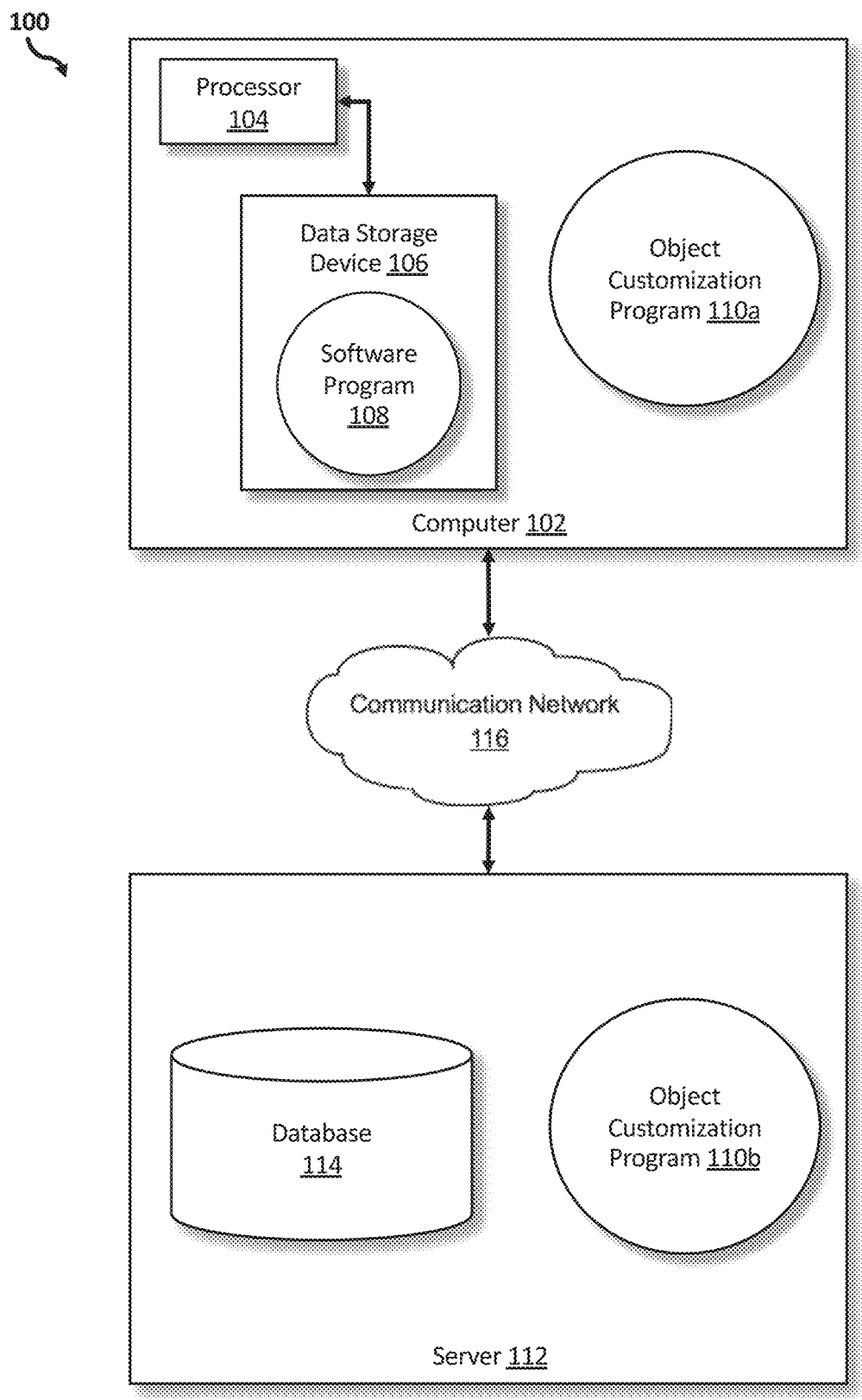
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, Python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for generating a custom object. As such, the present embodiment has the capacity to improve the technical field of object customization by supporting personalized selections from a static list and adding the personalized selections for offerings to the public. More specifically, the object customization program may browse and parse a static list of previously determined objects, and may extract constituent components associated with each object on the static list. The user may select and order a custom object, and the object customization program may dynamically price the custom object, subject to an agreement by both the user and the vendor. The object customization program may produce instructions for creating the custom object in which the custom object may be presented to the user. The object customization program may further transform the custom object into a large-scale industry-based trend based on the quantified popularity value associated with the custom object.

As previously described, in certain industries, for example, the fashion and food industries, static lists of objects are created in which customers may select one or more previously determined objects from the static list. In the restaurant industry, for example, online menus and online ordering have become commonplace depending on whether the ordered food is delivered or picked-up by the customer. The customer is, however, limited on how (if at all) food items may be customized by substitution of side dishes, entrees, or certain ingredients. In the fashion industry, for example, the options for customized clothing items at a clothing store or department store are even more limited in which a customer may have to separately design the clothing item. Regardless of the industry, the process of creating a personalized (i.e., customized) object from a static list of objects may be, at best, time and resource consuming.

Due to the boom in artificial intelligence (AI) technology innovation, there is an increased use in natural language processing (NLP), computer vision, machine learning (ML) and computational creativity in reviewing, identifying, analyzing and creating personalized objects from a static list of objects. A growing number of customers are interested in creating their own unique products (i.e., personalized objects), and not merely selecting from a static list of previously determined objects or products. The object customization process may lead to an enhanced singular shopping experience for a customer.

Additionally, since not every customer is eager to create personalized products, there is a growing popularity for people to follow a trend created by a customer. As such, the people may adopt or order the personalized product created by the customer.

Therefore, it may be advantageous to, among other things, create a personalized (or customized) product (or object) from a static list of previously determined objects (or products) based on a set of constituent components included in each previously determined object in a fast and less time-consuming manner with minimal (if any) resources. The personalized object may then be transformed into a trend for other people to observe and order, if desired. As such, based on the popularity of the personalized object, the personalized object may be integrated into the static list of previously determined objects.

According to at least one embodiment, the object customization program may utilize natural language processing (NLP) to analyze a static list of previously determined objects, and may then generate a list of constituent components for each type of previously determined objects included in the static list, and create a new custom object by utilizing a variety of algorithms (e.g., collaborative filtering, pairing, search, computational creativity) and data sources (e.g., purchase history, personal preferences). The custom object may then be priced dynamically based on the price of the previously determined objects on the static list, and the necessary level of customization. The present embodiment may include adding each custom object to a new section of the static list. Customers may then advertise the custom object on social media, and may encourage other people (e.g., friends, family, co-workers) to purchase the custom object. The customer, who created the custom object, may then receive rewards (e.g., profits, gift cards, cashback points) for each sale of the custom object.

According to at least one embodiment, the object customization program may then select some of the emerging creations, and attempt to transform the emerging creations into large scale industry-based trends by offering the emerging creation in an associated place of purchase (e.g., website, department store, flagship store, restaurant, food manufacturer) and identifying influencers (e.g., people) who may increase the interest in the emerging creations at the associated place of purchase.

According to at least one embodiment, the object customization program may add variety to a static list of previously determined objects by including custom objects and some of the emerging creations. The object customization program may also generate additional orders and revenue for an associated place of purchase. The customers, utilizing the object customization program, may create a custom object, and transform that custom object into a global industry-based trend, or emerging industry-based trend (i.e., emerging creation).

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an object customization program 110a. The networked computer environment 100 may also include a server 112 that is enabled to run an object customization program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, smart phone, a telephone, a personal digital assistant, a netbook, a laptop computer, a tablet computer, a desktop computer, a wearable device (such as, a smart watch, and augmented reality/virtual reality (AR/VR) glasses), an electronic reader, or any type of computing devices capable of running a program, accessing a network, and accessing a database 114. According to various implementations of the present embodiment, the object customization program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the object customization program 110a, 110b (respectively) to generate a custom object from a static list of previously determined objects and to transform the custom object into an industry-based trend. The custom object method is explained in more detail below with respect to FIGS. 2 and 3.

Figure 2:
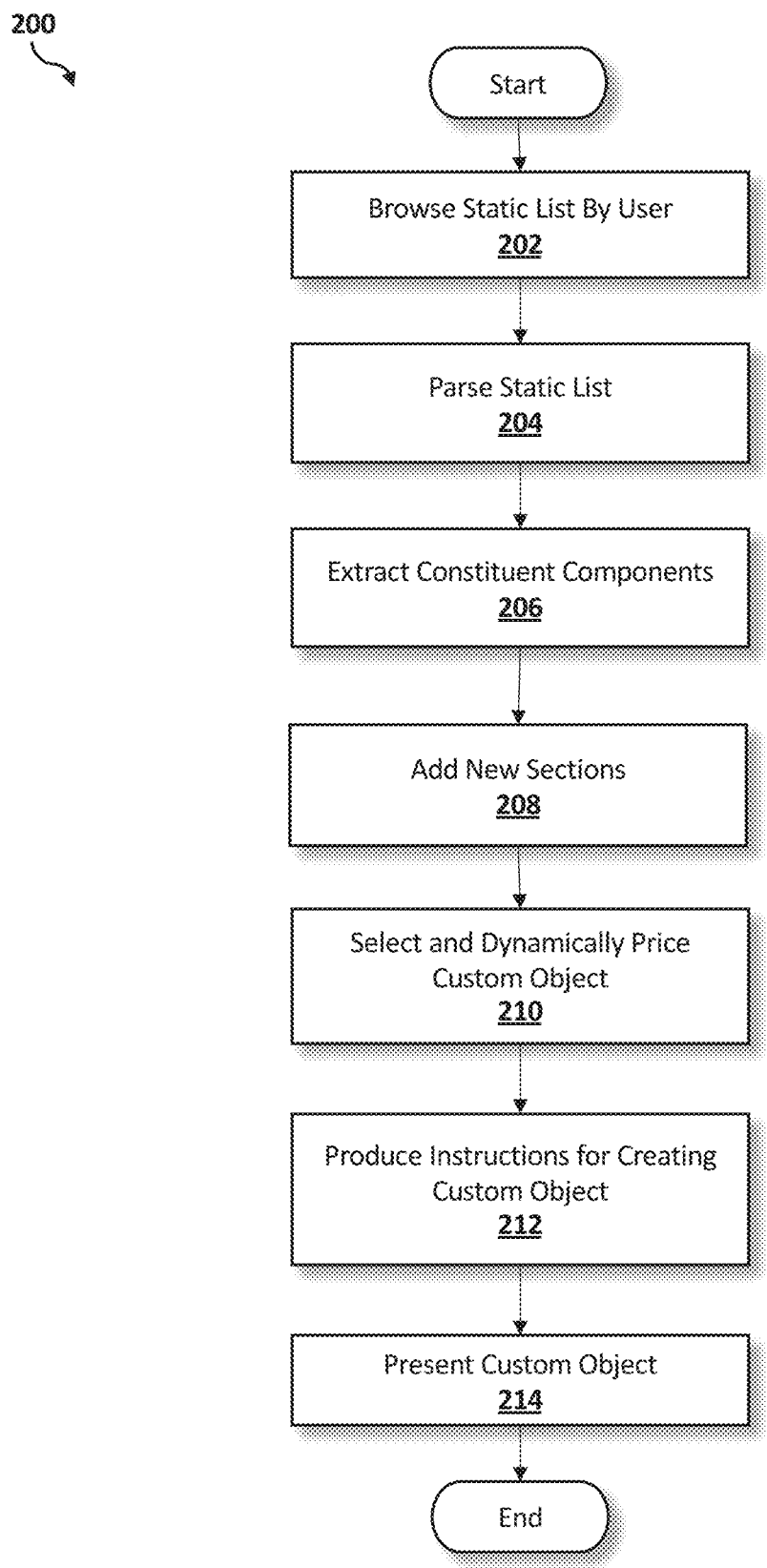
FIG. 2 is an operational flowchart illustrating a process for generating a custom object according to at least one embodiment.

Referring now to FIG. 2, an operational flowchart illustrating the exemplary custom object generation process 200 used by the object customization program 110a, 110b according to at least one embodiment is depicted.

At 202, a static list is browsed by a user. Utilizing a software program 108 on the user device (e.g., user computer 102), a static list of previously determined objects may be received as input on the user device associated with the object customization program 110a, 110b, via a communication network 116. The user device associated with the object customization program 110a, 110b may be utilized by the user to browse the static list of previously determined objects. The data (e.g., static list of previously determined objects) may be transmitted, via a communication network 116, from the user device.

In at least one embodiment, the object customization program 110a, 110b may request that the user confirms the identity associated with the user (i.e., user identity) prior to, or while the user is, browsing the static list. The object customization program 110a, 110b may identify the user by prompting the user (e.g., via dialog box) to provide the user name and password associated with the user. The dialog box, for example, may include a label "Username" with a blank comment box to the right, and a label "Password" with a blank comment box to the right. Once the user enters the user name and password associated with the user, the user may select the "Submit" button located at the bottom of the dialog box. Each user name and password may be associated with a user profile (i.e., personal profile), which is stored on a user database (e.g., database 114) associated with the object customization program 110*a*, 110*b*.

If, however, the user is first-time user, then, according to at least one implementation, the user, for example, may click the "First-Time User" button located to the left of the "Submit" button in the dialog box. The user may then be prompted (e.g., via dialog box) to create a user profile with personal characteristics of the user (e.g., full name, preferred name, email address, age, gender, user preferences). Once the user finishes setting up the user profile, then the user may click the "Finish" button located on the bottom of the dialog box. The created user profile may then be stored on the user database. The user preferences may include past custom objects selected and ordered by the user based on the specific industry. For example, the user preferences include any food allergies, food tolerance and favorite food types for the food industry, include any favorite color, styles and size preferences for the fashion industry, and include design style and favorite color palettes for the furniture industry.

In the present embodiment, prior to collecting data (e.g., user preferences) associated with the user from the user profile, the object customization program 110*a*, 110*b* may receive consent, via opt-in or opt-out features, from the user. Additionally, the object customization program 110*a*, 110*b* may prompt (e.g., via dialog box) the user when the object customization program 110*a*, 110*b* intends to collect data associated with the user from the user profile.

For example, the object customization program 110*a*, 110*b* prompts, via a dialog box, the user to confirm the identity of the user. The dialog box states, "Are you User X?," with a "Yes" button and "No" button located at the bottom of the dialog box. User X clicks the "Yes" button, and the object customization program 110*a*, 110*b* further prompts User X, via a dialog box, that the object customization program 110*a*, 110*b* is requesting access to the user profile, from the user database, associated with User X. At the bottom of the dialog box is a "Opt-in" button and "Opt-out" button. User X clicks the "Opt-in" button and the object customization program 110*a*, 110*b* proceeds to access the user profile associated with the User X from the user database. User X then proceeds to browse a dinner menu for a local restaurant.

Next, at 204, the static list is parsed. The object customization program 110*a*, 110*b* may parse through the static list of previously determined objects by utilizing natural language processing (NLP) techniques, or ontology structure (i.e., a set of concepts and categories in a subject area or domain that shows the properties, relations or attributes associated with each object within that subject area or domain). As such, the utilization of various NLP techniques (e.g., content categorization, topic discovery and modeling, contextual extraction, sentiment analysis, machine translation, document summarization) may assist with the evaluation of the description included with each previously determined object in the static list.

In at least one embodiment, the object customization program 110*a*, 110*b* may directly, or through an external engine (i.e., NLP parser), utilize NLP techniques, through which the static list of previously determined objects may be broken down into shorter, elemental textual pieces (i.e., individual previously determined objects), and the name (e.g., title) of each individual previously determined object and the description associated with each individual previously determined object may be further broken down to determine the constituent components (i.e., attributes or ingredients that is included in the individual previously determined objects) of each individual previously determined object. For example, in the food industry, the static list may be a take-out menu, the individual previously determined objects are the individual food items on the take-out menu (e.g., the dish types) and the constituent components are the ingredients in each food item that may be mentioned in the description of the food item or within the name of the food item, such as "Hawaiian pizza with ham and pineapple." In another example, in the fashion industry, the static list may be a website with images of different shirts sold based on a particular store or brand. The constituent components include the color, clothing materials or fabric (including cotton, denim, rayon, polyester), size, and style associated with each shirt that are indicated in the product details and name of the shirt, such as "ABC Brand 100% Organic Cotton Crew Neck Sweater with Removable Hoodie."

In at least one embodiment, the object customization program 110*a*, 110*b* directly, or through an external engine (i.e., NLP parser), may utilize NLP techniques to explore the relationships between each of the constituent components (e.g., amount of, quantity of, or quantity of each constituent component in the individual previously determined object, the importance of each constituent component) to determine the constituent components that are different or similar between each of the individual previously determined objects in the static list. For example, in the restaurant industry, for a slice of cheese pizza, the object customization program 110*a*, 110*b* determines that tomato sauce, pizza dough and mozzarella cheese are constituent components from the menu description. The object customization program 110*a*, 110*b* further determines that the pizza dough is not gluten-free, since the description fails to include such, and therefore, the pizza dough includes flour, water, olive oil and yeast for a slice of cheese pizza. In another example, the object customization program 110*a*, 110*b* compares the description of the slice of cheese pizza with a slice of gluten-free pepperoni pizza. The object customization program 110*a*, 110*b* determines, based on the name and description associated with the slice of pepperoni pizza that the slice of pepperoni pizza includes the same ingredients, except with gluten-free flour in the pizza dough and pepperoni slices.

In some embodiments, the object customization program 110*a*, 110*b* may directly, or through an external engine (i.e., NLP parser), identify the type of previously determined object based on the description of the previously determined object and, in some instances, the location of the previously determined object in the static list. For example, in the restaurant industry, the NLP parser searches through a restaurant menu to determine the syntactic structure of the text utilized in the restaurant menus and analyze the words included in the text including sub-headings, headings, menu descriptions for a particular food item or title of the food item. The NLP parser then determines that the slice of cheesecake is a dessert since the menu description associated with the cheesecake states "a sweet scrumptious treat after a savory entrée." The use of the words "after" and "entrée" indicates that the cheesecake should be eaten after dinner, and a meal after dinner is a dessert. The NLP parser then confirms this determination by analyzing the sub-heading, "Dessert," which the cheesecake is located under in the restaurant menu.

In some embodiments, the object customization program 110*a*, 110*b* may, directly or through an external engine, utilize an ontology structure to determine the hierarchies of the previously determined objects and the constituent components associated with the individual previously determined objects. For each entry (e.g., individual previously determined object) in the static list, the ontology structure may determine the level of importance associated with the specific composition of each constituent component associated with each previously determined object. For example, with a slice of cheese pizza, the object customization program 110a, 110b further determines that three tablespoons of homemade tomato sauce, and three tablespoons of mozzarella cheese are included in the slice of cheese pizza, as well as less than two tablespoons of each of the ingredients to make the pizza dough: flour, water, olive oil and yeast for slice of cheese pizza. The object customization program 110a, 110b further determines that the tomato sauce and mozzarella cheese are the most important ingredients or constituent components for the slice of pizza. In another example, the object customization program 110a, 110b compares the relationship of the ingredients in the slice of cheese pizza with the ingredients in a slice of pepperoni pizza, and determines that the slice of pepperoni pizza includes the same ingredients, except only two-and-a-half tablespoons of mozzarella cheese (half a tablespoon less than the slice of cheese pizza) and includes six thinly sliced pieces of pepperoni. Therefore, the ingredient of mozzarella cheese is of less importance in the slice of pepperoni pizza than the slice of cheese pizza, and the inclusion of thinly sliced pepperoni pieces are a distinction between the two slices of pizza.

In some embodiments, the object customization program 110a, 110b, directly or through a software program 108 (i.e., search engine), may utilize the ontology to obtain different versions of the same previously determined object, or different constituent components of previously determined objects. Utilizing a software program 108, the object customization program 110a, 110b may search the internet (including social media) for alternates to the same previously determined object, or different constituent components of a previously determined object. The object customization program 110a, 110b may receive the alternates or different constituent components as input, via a communication network 116. For example, in the fashion industry, the object customization program 110a, 110b uses a search engine to find different red shirts, for the user, with different styles, fabrics and brands.

In another embodiment, the object customization program 110a, 110b may create a list of custom objects and a list of available constituent components associated with each custom object.

Continuing the previous example, User X provides a dinner menu for the local restaurant menu, as an input. The dinner menu is then fed into the NLP parser that breaks down the dinner menu into individual meals or food items. The NLP parser then further breaks down the individual meals into constituent components (i.e., ingredients) by utilizing NLP techniques, based on the title of each meal or food item and the description for each meal or food item listed on the dinner menu. For a chicken green curry dish, the menu description states, "This savory and delicious dish includes green curry, chicken thighs, coconut milk, kaffir lime leaf, fresh basil, eggplant and bell pepper, served with jasmine rice." The object customization program 110a, 110b further compares the chicken green curry with a vegan red curry dish. For the vegan red curry dish, the menu description states, "This yummy vegan dish includes red curry, coconut milk, tofu, kaffir lime leaf, bamboo shoot, fresh basil and bell pepper, served with *quinoa*." The object customization program 110a, 110b, by utilizing NLP techniques and the ontology structure, determines that the vegan red curry dish and the chicken green curry dish include the following different ingredients: different types of curry (i.e., green curry vs. red curry), different types of protein (i.e., chicken thighs vs. tofu), one different ingredient (i.e., eggplant vs. bamboo shoots), and a different side dish (jasmine rice vs. *quinoa*). In addition, since the title of each dish includes the type of protein and the type of curry, the object customization program 110a, 110b determines that the type of curry and type of protein are important distinctions between the two dishes.

Then, at 206, constituent components are extracted. The object customization program 110a, 110b may then extract the constituent components associated with the previously determined objects. The object customization program 110a, 110b may then estimate the quantity associated with each extracted constituent component by searching for similar recipes in an instruction database (e.g., database 114), or on the Internet (e.g., credible websites, social media posts). The object customization program 110a, 110b may then assign a price to each constituent component.

In at least one embodiment, the object customization program 110a, 110b may determine the credibility of a website based on various factors, such as the reviews and/or comments included by other users on the website, the institution associated with the website (e.g., well-known culinary school), and any ratings provided by past users for the website. In some embodiments, the object customization program 110a, 110b may evaluate the credibility of the particular recipe, not only the credibility of the website where the recipe is posted. The object customization program 110a, 110b may determine whether the recipe is credible based on the comments and/or reviews associated with the particular recipe, and the rating (e.g., 4.8 stars out of 5 stars) associated with the particular recipe.

In the present embodiment, the object customization program 110a, 110b may assign a score to each factor (e.g., 0 to 10, 0 to 1, 0 to 100), and the average score associated with the factors may be calculated to determine the overall score for the website and/or particular recipe. If the average score is the median of the score range (e.g., 5 out of 10, 0.5 out of 1, 50 out of 100), then the object customization program 110a, 110b may determine that the website and/or particular recipe is credible.

In at least one embodiment, the object customization program 110a, 110b may utilize the specific composition of each individual previously determined object in the static list from the ontology structure to estimate the quantity and quality of each constituent component of each previously determined object. The object customization program 110a, 110b may then retrieve, by comparing prices of objects with this constituent component on the internet and in the static list, the average market price for that constituent component. The object customization program 110a, 110b may then apply a markup to the price of the constituent component.

In at least one embodiment, the markup applied by the object customization program 110a, 110b depends on the average markup in the static list. For example, in the fashion industry, if the average markup is 200% in the static list for each previously determined object on the static list, then the object customization program 110a, 110b will apply a 200% markup on the 100% organic cotton sweater. In another embodiment, the markup applied by the object customization program 110a, 110b depends on the average markup for that constituent component in that specific industry. For example, in the fashion industry, if the average markup is 300% in the industry for a 100% organic cotton product, then the object customization program 110a, 110b will apply a 300% markup on the 100% organic cotton sweater in which 100% organic cotton is priced at approximately $6.50 per yard.

Continuing the previous example, the object customization program 110a, 110b extracts the constituent components for each meal or food item on the restaurant menu, and estimates the quantity of each constituent component by searching for similar recipes in the instruction database. For the chicken green curry dish, the object customization program 110a, 110b estimates that the recipe probably includes: one tablespoon of Thai green curry paste, two pieces of organic chicken thighs, one cup of coconut milk, two kaffir lime leaves, three fresh basil leaves, ½ cup of eggplant and ½ of a large bell pepper, served with one cup of jasmine rice. As such, the object customization program 110a, 110b determines that the price for each of these ingredients are as follows: one tablespoon of Thai green curry paste ($0.10), two pieces of organic chicken thighs ($2.25), one cup of coconut milk ($0.60), two kaffir lime leaves ($0.76), three fresh basil leaves ($0.45), ½ cup of eggplant ($1.45) and ½ of a large bell pepper ($0.33), served with one cup of jasmine rice ($0.67).

Additionally, since the object customization program 110a, 110b determines that the markup applied to other dinner dishes on this dinner menu is approximately 200% to 250%, the object customization program 110a, 110b determines that a 200% to 250% markup will be applied for each ingredient (and any subsequent custom dish) ordered from the local restaurant.

Then, at 208, new sections are added. The object customization program 110a, 110b may then add new sections to the static list of previously determined objects to include at least three new sections: (1) the static list; (2) list of custom objects (e.g., "Make Your Own"); and (3) list of popular objects previously customized and created by other users (e.g., "Trending Creations").

To create a new section that includes a list of custom objects, the object customization program 110a, 110b may analyze the user preferences, identify the core constituent components associated with the objects, and determine whether the core constituent components are available at the place of purchase. The object customization program 110a, 110b may then generate variations on each object utilizing the available constituent components at the place of purchase (i.e., one or more custom objects).

In at least one embodiment, the object customization program 110a, 110b may utilize a graphical user interface (GUI) to add new sections to the static list. The GUI may allow the user, via the user devices, to interact with the graphical icons and visual indicators associated with each object (e.g., custom objects, popular objects and previously determined objects).

In at least one embodiment, the object customization program 110a, 110b may determine which custom objects and popular objects to generate for the user based on various external factors (e.g., location, weather conditions, season, user preferences). For example, in the restaurant industry, if the user preferences indicate that the user is allergic to peanuts and seafood, the custom objects and popular objects with peanuts and/or seafood will be excluded from the lists. In another example, in the fashion industry, during the summer season, the object customization program 110a, 110b may exclude clothing items for colder weather, such as sweaters, flannel fabrics and down coats.

In another embodiment, the object customization program 110a, 110b may list custom and popular objects that the user may prefer higher on the list to increase the chances of the user noticing these objects. For example, if User A indicates in the user preferences that User A loves tweed blazers, then the object customization program 110a, 110b will include any possible custom tweed blazers, or popular tweed blazers at the top of User A's browsing list. Therefore, User A is most likely to see these tweed blazers while searching the different lists.

In at least one embodiment, the object customization program 110a, 110b may recommend one or more possible custom objects or popular custom objects based on the user preferences or other external factors (e.g., weather conditions, seasons). For example, the user is browsing through a pizza menu. An application programming interface (API) determines that the season is summer, the weather is warm and humid and, based on the user preferences, the user prefers a plant-based diet. Therefore, the API will upload, via a communication network 116, to the object customization program 110a, 110b pizza toppings that include seafood and leafy green vegetables, such as a pizza with calamari and kale as the main pizza toppings.

Continuing the previous example, the object customization program 110a, 110b may then generate three different sections based on the fixed dinner menu, the popular dishes created by other users, and possible custom dishes that User X may create based on the ingredients included in the dishes on the fixed dinner menu. Since, based on the user preferences, User X is allergic to peanuts and loves to spicy foods, the list of popular dishes created by other users and the possible custom dishes that User X may create excludes any dishes with peanuts and places higher on the list dishes (without peanuts) that are spicy.

Then, at 210, a custom object is selected and dynamically priced. Utilizing the GUI associated with the object customization program 110a, 110b, the user may then select a custom object to order. The object customization program 110a, 110b may then retrieve the custom object selected by the user, and then, by utilizing the previously generated data associated with the average price for each constituent component, may compute a preliminary price for the custom object. The object customization program 110a, 110b may then apply a markup to each constituent component included in the custom object selected by the user, or to the custom object directly based on the preliminary price for the custom object, to compute the final price for the custom object.

In some embodiments, the object customization program 110a, 110b may generate a base price for specific type of objects, and then may add an additional price for a custom object. For example, the user selects a slice of pizza with green peppers, onions and anchovies. The object customization program 110a, 110b may, based on the static list, charge $2.00 per slice of pizza and $0.25 for each additional pizza topping. Therefore, the object customization program 110a, 110b will dynamically generate a price of $2.75 for a slice of pizza with green peppers, onions and anchovies.

In at least one embodiment, the object customization program 110a, 110b may present the proposed price to the user and the vendor (i.e., providing the custom object). The proposed price may be approved by both the user and vendor, or may result in price adjustments for the custom object. For example, in the furniture industry, the user selected a customized leather 9-piece sectional sofa, which the object customization program 110a, 110b dynamically priced at $10,500.00 based on the average market price and the markup applied by the particular vendor to other similar furniture items on the static list.

The object customization program 110a, 110b displays, via a dialog box, the proposed price of the customized leather 9-piece sectional sofa to the user and ABC Furniture Company who is designing and manufacturing the customized leather 9-piece sectional sofa. At the end of the bottom of the dialog box is an "Agree with Price" button and a "Disagree with Price" button. If the user and the ABC Furniture Company both select the "Agree with Price" button, then the dialog box disappears, and the user and ABC Furniture Company receive a second dialog box indicating that there is an agreement with the price.

If, however, either the user or ABC Furniture Company clicks the "Disagree with Price" button, then both the user and ABC Furniture Company will be directed to continue the price negotiation on a separate messaging forum associated with the object customization program 110a, 110b until a price has been agreed upon, or either the user or ABC Furniture Company decides to end the transaction (e.g., the user clicks a "Cancel Order" button located at the bottom of the user's messaging forum, or ABC Furniture Company clicks a "Decline Order Request" button at the bottom of the vendor's messaging forum).

Continuing the previous example, User X, using the object customization program 110a, 110b, decides to create a vegan green curry dish with bamboo shoots, baby corn and extra eggplant pieces, and served with jasmine rice. The object customization program 110a, 110b then dynamically prices the custom vegan green curry dish with bamboo shoots, baby corn and extra eggplant pieces, and served with jasmine rice. The object customization program 110a, 110b may include the following breakdown of the ingredients and prices: one tablespoon of Thai green curry paste ($0.10), eight ounces of firm tofu ($1.25), one cup of coconut milk ($0.60), two kaffir lime leaves ($0.76), three fresh basil leaves ($0.45), ¾ cup of eggplant ($2.18), ½ of a large bell pepper ($0.33), five pieces of bamboo shoots ($0.50) and four pieces of baby corn ($0.14) served with one cup of jasmine rice ($0.67) for a total of $6.98 to produce the custom vegan green curry dish with bamboo shoots, baby corn and extra eggplant pieces, and served with jasmine rice. Additionally, the object customization program 110a, 110b applies a 201% markup to the custom vegan green curry dish with bamboo shoots, baby corn and extra eggplant pieces, and served with jasmine rice for a final price of $14.00. After the final price of $14.00 was determined by the object customization program 110a, 110b, the object customization program 110a, 110b prompts, via a dialog box, User X and the local restaurant to determine whether each agrees to the $14.00 final price for the custom vegan green curry dish with bamboo shoots, baby corn and extra eggplant pieces, and served with jasmine rice. For User X, the dialog box states, "Do you wish to proceed with ordering the custom vegan green curry dish with bamboo shoots, baby corn and extra eggplant pieces, and served with jasmine rice with a final price of $14.00 (excluding taxes and tips)?," and at the bottom of the dialog box includes a "Yes" button and a "No" button. For the local restaurant representative, the dialog box states, "Do you agree to produce a custom vegan green curry dish with bamboo shoots, baby corn and extra eggplant pieces, and served with jasmine rice with a final price of $14.00 (excluding taxes)?" with a "Yes" button and a "No" button located at the bottom of the dialog box. Both the User X and the local restaurant representative clicked the "Yes" buttons on the respective dialog boxes.

Then, at 212, the instructions for creating the custom object are produced. Utilizing the GUI, the object customization program 110a, 110b may then present the user with graphical icons and images associated with the selected custom object. The user may then select a series of graphical icons or images associated with different versions or constituent components that may be included in the custom object. Based on the selections of the user, the object customization program 110a, 110b may produce a series of instructions or suggestions for the vendor associated with the custom object detailing how the custom object may be produced, designed, presented to the user, or made. The instructions may be generated by utilizing previously searched alternates or versions of the custom object or to the constituent components associated with the custom object, by utilizing image searches performed by APIs associated with the object customization program 110a, 110b. The vendor may then utilize the produced instructions to create the custom object for the user.

In at least one embodiment, the object customization program 110a, 110b may utilize graphs to determine and produce instructions for the custom object. The object customization program 110a, 110b may organize the possible instructions into a sequence of tasks that connect the constituent components to the custom object. The sequences may be viewed as a graph (e.g., directed acyclic graph) in which the vertices represent either the constituent components or tasks, and the edges capture the order of each constituent component or task. The graph may display many steps completed in parallel to each other, by analyzing the inputs and outputs of each step and only retaining the edges. The object customization program 110a, 110b may further examine each constituent component and create one or more plausible sequences of tasks that may be involved, and each sequence may include a subgraph that starts with one or more constituent components and end with the last instruction task, which produces the custom object. For each constituent component, the object customization program 110a, 110b may extract from the subgraphs the same object category and the same constituent component or component type from the instruction database. If no subgraph includes the constituent component or component type, the object customization program 110a, 110b may extend the search to similar constituent component types. The object customization program 110a, 110b may then eliminate any high-level preparation instructions (e.g., for the food industry, "preheat" or "transfer") and may merge any redundant instructions (e.g., for the food industry, two consecutive "add" and "mix" verbs). The resulting subgraphs for the given ingredient may be then clustered and each cluster may be assigned a suitability score in which the clustering may utilize a weighted graph edit distance and a bisecting k-means algorithm, where the k may be chosen so that the largest distance in any cluster remains below a certain threshold. As such, each cluster may include subgraphs that handle a constituent component in roughly the same manner from start to finish. The score of each cluster may be based on the number of subgraphs in the cluster, weighted by the relevance of each subgraph to the constituent component (e.g., subgraphs that start with the same constituent component may receive a higher weight than subgraphs that include only the same constituent component type, and a higher score may indicate that a cluster describes a very common action sequence and/or closely matches the constituent component used in the same instruction). The object customization program 110a, 110b may then sort the subgraph clusters by decreasing suitability scores, and the object customization program 110a, 110b may then select the highest rank as the preferred method for handling the constituent component. Next, the object customization program 110a, 110b may produce an instructions graph by merging the subgraphs associated with the constituent components of the custom object, thereby producing high-level instructions for the custom object.

In at least one embodiment, the object customization program 110a, 110b may present to the user with a maximum of two options for producing, making or designing the custom object. The object customization program 110a, 110b may then, based on the selections made by the user (i.e., user selections) create instructions for the vendor on how to create the custom object.

Continuing the previous example, the object customization program 110a, 110b will produce the specific ingredients and instructions or recipe to the local Asian restaurant to create the custom vegan green curry dish with bamboo shoots, baby corn and extra eggplant pieces, and served with jasmine rice, which includes: one tablespoon of Thai green curry paste, eight ounces of firm tofu, one cup of coconut milk, two kaffir lime leaves, three fresh basil leaves, ¾ cup of eggplant, ½ of a large bell pepper, five pieces of bamboo shoots, four pieces of baby corn, and one cup of jasmine rice.

Then, at 214, the custom object is presented. The custom object generated by the object customization program 110a, 110b may be presented (e.g., via delivery or generated by the user's computer 102 depending on the type of custom object and the industry in which the custom object is associated with) to the user.

In at least one embodiment, the object customization program 110a, 110b may utilize a virtual assistant, audio-enabled device, or API to confirm the status of the custom object (e.g., mode and time of delivery and confirm that the order for the custom object is completed).

Continuing the previous example, the local restaurant proceeds with creating the custom vegan green curry dish with bamboo shoots, baby corn and extra eggplant pieces, and served with jasmine rice for User X. Once the custom vegan green curry dish with bamboo shoots, baby corn and extra eggplant pieces, and served with jasmine rice is completed, the object customization program 110a, 110b may utilize an API to send an email and text message to User X with an estimated time in which custom dish will be delivered to User X's current location.

Figure 3:
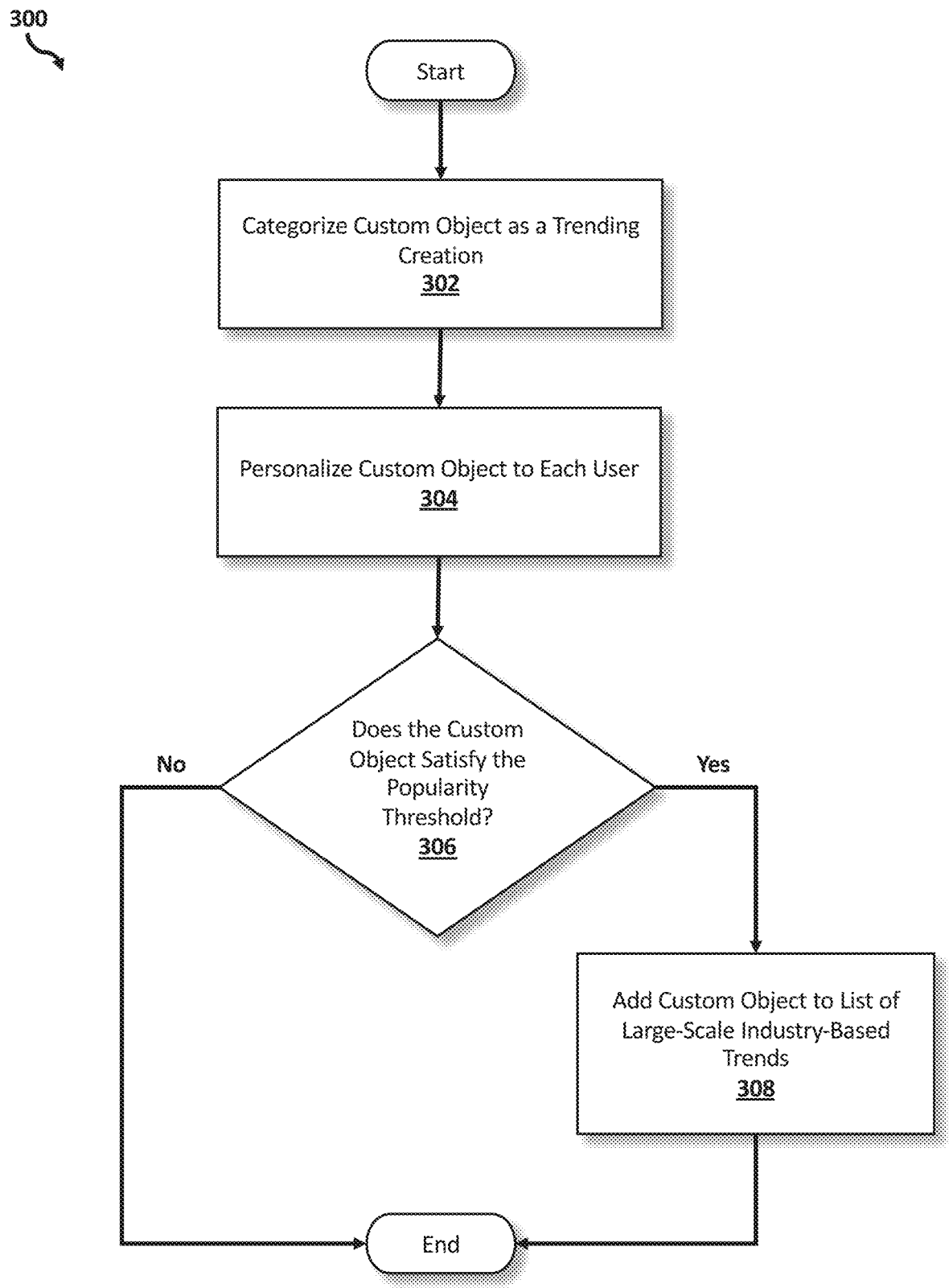
FIG. 3 is an operational flowchart illustrating a process for transforming an industry-based trend according to at least one embodiment.

Referring now to FIG. 3, an operational flowchart illustrating the exemplary industry-based trend transformation process 300 used by the object customization program 110a, 110b according to at least one embodiment is depicted.

At 302, the custom object is categorized as a trending creation. The object customization program 110a, 110b may add the custom object (e.g., user creation) created by the user into the list of popular objects previously customized and created by other users (e.g., "Trending Creations") associated with the place of purchase or the particular vendor. Therefore, different users (e.g., customers) may order the custom object created by the user.

In at least one embodiment, the user may upload, by utilizing a software program 108 associated with the user device (e.g., user's computer 102), an image and a description of the custom object on the list of popular objects associated with the place of purchase or the particular vendor, via a communications network 116. The place of purchase and the particular vendor may have to approve the uploaded image and/or description prior the inclusion of the uploaded image and description to the list of popular objects associated with the place of purchase or the particular vendor.

Continuing the previous example, the object customization program 110a, 110b adds the custom vegan green curry dish with bamboo shoots, baby corn and extra eggplant pieces, and served with jasmine rice, with the price, to the "Trending Creations" list associated with the local restaurant. Since User X uploaded several images of the custom dish, as well as a description for the custom dish, a representative of the local Asian restaurant reviewed and approved two of the images and the description. The approved images and description are subsequently uploaded onto the website of the local restaurant.

Next, at 304, the custom object is personalized for each user. The object customization program 110a, 110b may then determine which users the custom object (e.g., user creation) should be shown to. By utilizing some form of recommender engine (e.g., collaborative filtering), the object customization program 110a, 110b may generate automatic predictions about the interests of a user by collecting preferences or information from many users. The object customization program 110a, 110b may analyze the similarities or differences of each user to generate predictions on the display order of the trending creations associated with the user (e.g., in the furniture industry, if person A and person B both prefer a contemporary modern design for their accent furniture, then person A and person B most likely will prefer other furniture with a similar contemporary modern design). The display order of the trending creations may depend on the overall popularity of each custom object, on their popularity within a given network of users, or the purchase history of a given user combined with machine learning (ML) algorithms (e.g., collaborative filtering).

Additionally, the custom object can be advertised online (e.g., on social networks or other web sites) by its creator or other people within its creator's network of friends. The object customization program 110a, 110b may track (e.g., via uniform resource locator (URL)) the number of users who order the custom object, and the path utilized by each user to order the custom object as a trending creation (i.e., the person or persons who referred the custom object to the users). Based on the data associated with tracking the number of users and the path utilized to place an order for the custom object, the object customization program 110a, 110b may determine the appropriate rewards to distribute to the user for creating or advertising the custom object. The distribution of rewards may encourage users to create custom objects and to share the custom objects to different users in a particular industry. For example, User A creates and shares a pizza creation with calamari and kale. User B, who is friends with User A, observes the new pizza under the "Trending Creations" section of the restaurant menu, and decides to inform User B's friends on social media that User B ordered and enjoyed the slice of pizza with calamari and kale. A number of User B's friends end up ordering slices of pizza with calamari and kale following the link provided by User B. As a result, User A who initially created the slice of pizza with calamari and kale will receive reward points from the restaurant for those purchases.

In at least one embodiment, since the object customization program 110a, 110b may track the path utilized by different users to order the custom object, the object customization program 110a, 110b may distribute reward points to the user who directed the other users to the custom object (e.g., created a hyperlink for other users to click and order the custom object). Continuing the previous example, the object customization program 110a, 110b will distribute reward points to User B as well. In some embodiments, the place of purchase or vendor may prompt the user (e.g., via dialog box or question included where the user includes purchase information) to provide details on where or from who the user heard about (or first learned about) the custom object.

Continuing the previous example, User X posts on User X's social media profile a hyperlink for the custom dish on the list of popular objects on the website of the local restaurant. Three of User X's co-workers (Users Y, Z and W) copy the hyperlink and include the hyperlink on their social media profiles. User Z, in addition, sends the hyperlink to several friends with the caption, "This dish looks very good." As such, several of User Z's friends ordered this custom dish from the local restaurant within two days of User X initially posting the hyperlink. The object customization program 110a, 110b tracks the orders to the hyperlinks sent by Users X and Z, and therefore, Users X and Z receive rewards points to the local restaurant for publicizing the custom dish.

Then, at 306, object customization program 110a, 110b determines whether the custom object satisfies a popularity threshold. The object customization program 110a, 110b may quantify the popularity of the custom object as a trending creation by assigning a percentage, score or rating to the custom object based on the number of users who have ordered the custom object within a specific period of time (e.g., default period of time is 30 days), the number of custom objects sold, the revenue generated by the sale of the custom object, or the profit generated by the sale of the custom object. The quantified amount may then be compared to a popularity threshold to determine whether the popularity of the custom object meets or exceeds the popularity threshold.

In at least one embodiment, the object customization program 110a, 110b may assign a percentage (or normalized range in which the total is 1, 10 or 100) based on the number of users that have ordered the custom object, and based on the popularity of the other custom objects available at the same place of purchase or vendor, to determine whether the custom object satisfies the popularity threshold. Therefore, the assigned percentage may indicate the percentile or rating of the custom object in relation to the other custom objects for sale at the same place of purchase or vendor. If the assigned percentage is equal to or greater than a previously determined threshold (e.g., 60%), then the custom object may be considered popular and may satisfy the popularity threshold.

In another embodiment, the object customization program 110a, 110b may assign a score (or normalized range in which the total is 1, 10 or 100) based on the number of users that have ordered the custom object, and based on the popularity of the other custom objects available at the same place of purchase or vendor, to determine whether the custom object satisfies the popularity threshold. Therefore, the score may indicate the rating of the custom object in relation to the other custom objects for sale at the same place of purchase or vendor. If the assigned score is equal to or greater than a previously determined threshold (e.g., 0.6 out of 1.0, 6 out of 10, 60 out of 100), then the custom object may be considered popular and may satisfy the popularity threshold.

In some embodiments, the object customization program 110a, 110b may assign a rating (e.g., low, moderate or high) based on the number of users that have ordered the custom object, and based on the popularity of the other custom objects available at the same place of purchase or vendor, to determine whether the custom object satisfies the popularity threshold. Therefore, the rating may indicate the level of popularity of the custom object in relation to the other custom objects for sale at the same place of purchase or vendor. If the assigned rating is moderate or high, then the custom object may be considered popular and may satisfy the popularity threshold.

Continuing the previous example, within a 30-day period, the custom vegan green curry dish with bamboo shoots, baby corn and extra eggplant pieces, and served with jasmine rice was ordered more than 100 times at the local restaurant. As such, the object customization program 110a, 110b compares the custom dish with other custom dishes, and determines that the custom vegan green curry dish with bamboo shoots, baby corn and extra eggplant pieces, and served with jasmine rice is the third highest ordered custom dish in the restaurant industry and the highest custom ethnic food dish during the same 30-day period. Therefore, the object customization program 110a, 110b assigns a quantified popularity score of 9.6 out of 10 for the custom vegan green curry dish with bamboo shoots, baby corn and extra eggplant pieces, and served with jasmine rice.

If the object customization program 110a, 110b determines that the custom object satisfies the popularity threshold at 306, then the custom object is added to a list of large-scale industry-based trends at 308. After the object customization program 110a, 110b compares the quantified popularity value associated with the custom object with the popularity threshold and determines that the custom object meets or exceeds the popularity threshold, the object customization program 110a, 110b may add the custom object to the list of large-scale industry-based trends. The objects included as a list of large-scale industry-based trends may be identified as the custom objects that collected the most orders in a specific industry (e.g., food industry) or industry category (e.g., Italian foods, pizza). The object customization program 110a, 110b may utilize the list of large-scale industry-based trends to amplify trending creations. The custom object included in the list of large-scale industry-based trends may be available for other vendors or places of purchase to identify and determine whether each vendor or place of purchase may decide to incorporate the custom object into the static list of previously created custom objects (e.g., "Trending Creations" section) associated with each vendor and each place of purchase.

In at least one embodiment, the custom object may remain on the list of large-scale industry-based trends until the popularity associated with the custom object decreases, and the custom object may fail to satisfy the popularity threshold. While the custom object remains on the list of large-scale industry-based trends, the user who created the custom object, and any influencer who promotes the custom object, may continue to receive rewards.

In some embodiments, the object customization program 110a, 110b may limit the custom objects listed in the large-scale industry-based trends to the specific industry or industry category. As such, a vendor or place of purchase which offers a product or an object within the same or similar industry or industry category may be able to view custom objects within the same or similar industry. In another embodiment, the vendor or place of purchase may view any custom object listed in the large-scale industry-based trends. However, the vendor or place of purchase may filter (e.g., via filtering setting features) the large-scale industry-based trends to limit the type of custom object the vendor or place of purchase may view. In at least one embodiment, the object customization program 110a, 110b may limit the custom object based on the characteristics (e.g., geographic location, neighborhood demographics, weather) of the place of purchase or vendor that the custom object originated from (e.g., originating location).

In at least one embodiment, the user with a custom object added to the list of large-scale industry-based trends may be identified as an influencer (e.g., influenced the most orders). In addition to the user who created the custom object (i.e., creator), an influencer may also include any other user who promotes the custom object to a specific category of consumers.

Continuing the previous example, since the default popularity threshold value is 6.0 for the object customization program 110a, 110b, the object customization program 110a, 110b weighs the quantified popularity score (9.6) of the custom dish against the popularity threshold value (6.0) and determines that the custom vegan green curry dish with bamboo shoots, baby corn and extra eggplant pieces, and served with jasmine rice satisfies the popularity threshold. Therefore, the custom dish is added to a list of the large-scale industry-based trends. Other ethnic restaurants are now able to view this custom dish and determine whether that particular local restaurant will offer this custom dish to any customers.

If, however, the object customization program 110a, 110b determines that the custom object fails to satisfy the popularity threshold at 306, then the object customization program 110a, 110b concludes. After the object customization program 110a, 110b compares the quantified popularity value associated with the custom object with the popularity threshold and determines that the custom object popularity value is lower than the popularity threshold, the object customization program 110a, 110b may not add the custom object to the list of large-scale industry-based trends.

In at least one embodiment, the object customization program 110a, 110b may continue to monitor the quantified popularity value of the custom object for a previously determined period of time (e.g., default 30 days). If the custom object fails to satisfy the popularity threshold within the previously determined period of time, then the object customization program 110a, 110b may cease to monitor the quantified popularity value of the custom object.

In at least one embodiment, the previously determined period of time may be based on the last time that the custom object was ordered. As such, the previously determined period of time restarts when another user or the user who created the custom object orders the custom object. Therefore, the object customization program 110a, 110b may continue to monitor the quantified popularity value of the custom object for the same previously determined period of time.

Continuing the previous example, if the custom vegan green curry dish with bamboo shoots, baby corn and extra eggplant pieces, and served with jasmine rice was assigned a quantified popularity score of less than 6.0 (the popularity threshold level), then the object customization program 110a, 110b determines that the custom dish fails to satisfy the popularity threshold. Therefore, the object customization program 110a, 110b will continue to monitor the quantified popularity value of the custom dish for the previously determined period of time, which is 30 days. If the quantified popularity value of the custom dish fails to satisfy the popularity threshold, then the object customization program 110a, 110b will stop monitoring the quantified popularity value until the custom dish is ordered again. The ordering of the custom dish will restart the monitoring process for the quantified popularity value associated with the custom vegan green curry dish with bamboo shoots, baby corn and extra eggplant pieces, and served with jasmine rice.

In the present embodiment, the object customization program 110a, 110b may include an opt-in and/or opt-out feature for the collection of any data associated with the user. In addition, the object customization program 110a, 110b may notify the user, when the object customization program 110a, 110b, or any associated software program 108 or APIs, begins to collect data associated with the user (e.g., previous purchase history, user preferences).

The functionality of a computer may be improved by the object customization program 110a, 110b because the object customization program 110a, 110b may automatically perform a transformation of a static list into a list that is customizable by the user, and may add trending new custom objects to the list. The object customization program 110a, 110b may further transform a local customable object into a trending creation that spans across the particular industries, and may receive increased visibility. The object customization program 110a, 110b may also include pedigree tracking of the custom object for rewards to be offered to the user who created the custom object and users who are trend makers.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
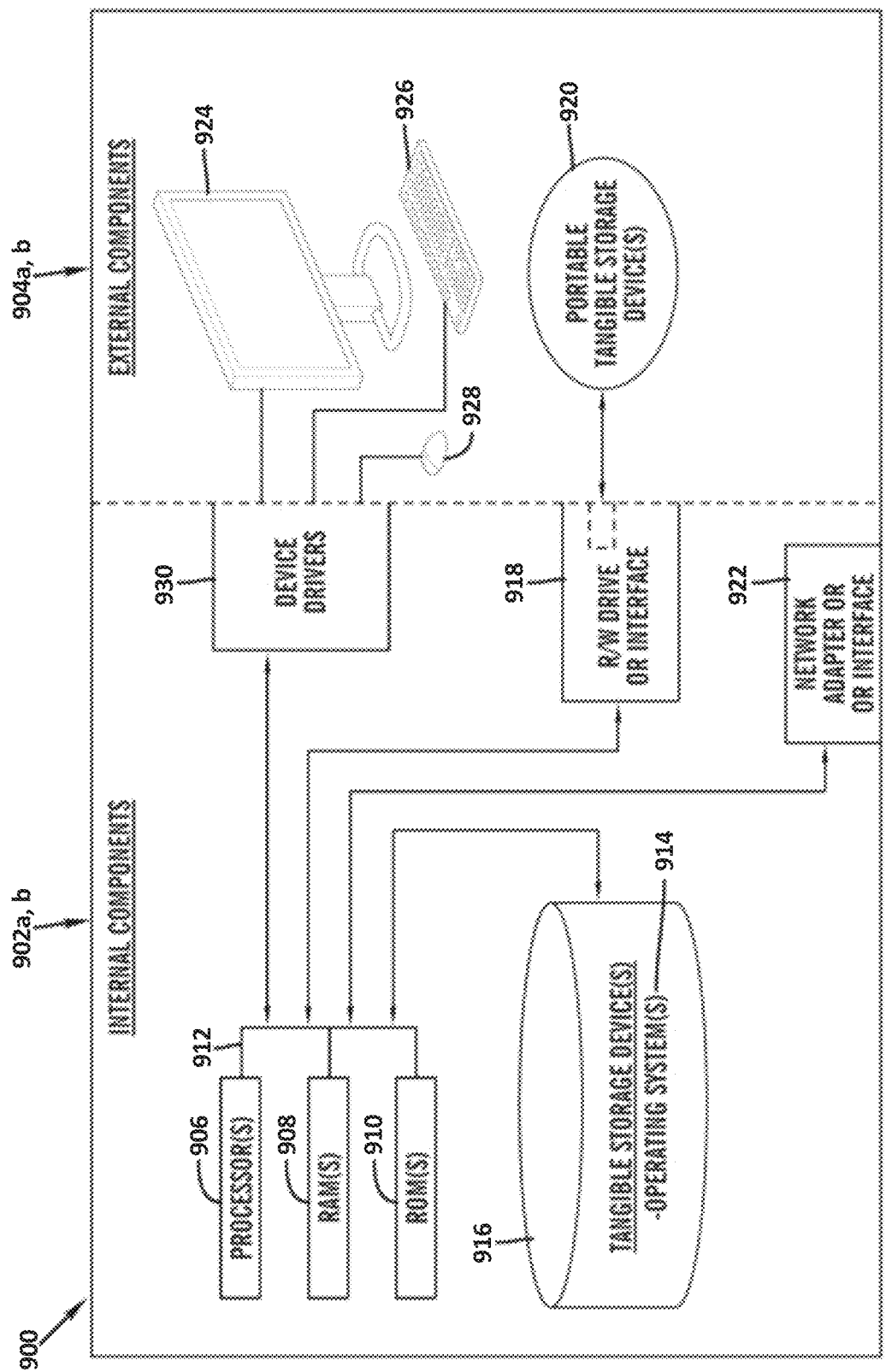
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 4. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the object customization program 110a in client computer 102, and the object customization program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the object customization program 110a, 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless Wi-Fi interface cards, or 3G or 4G wireless interface cards or other wired or wireless communication links. The software program 108 and the object customization program 110a in client computer 102 and the object customization program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the object customization program 110a in client computer 102 and the object customization program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
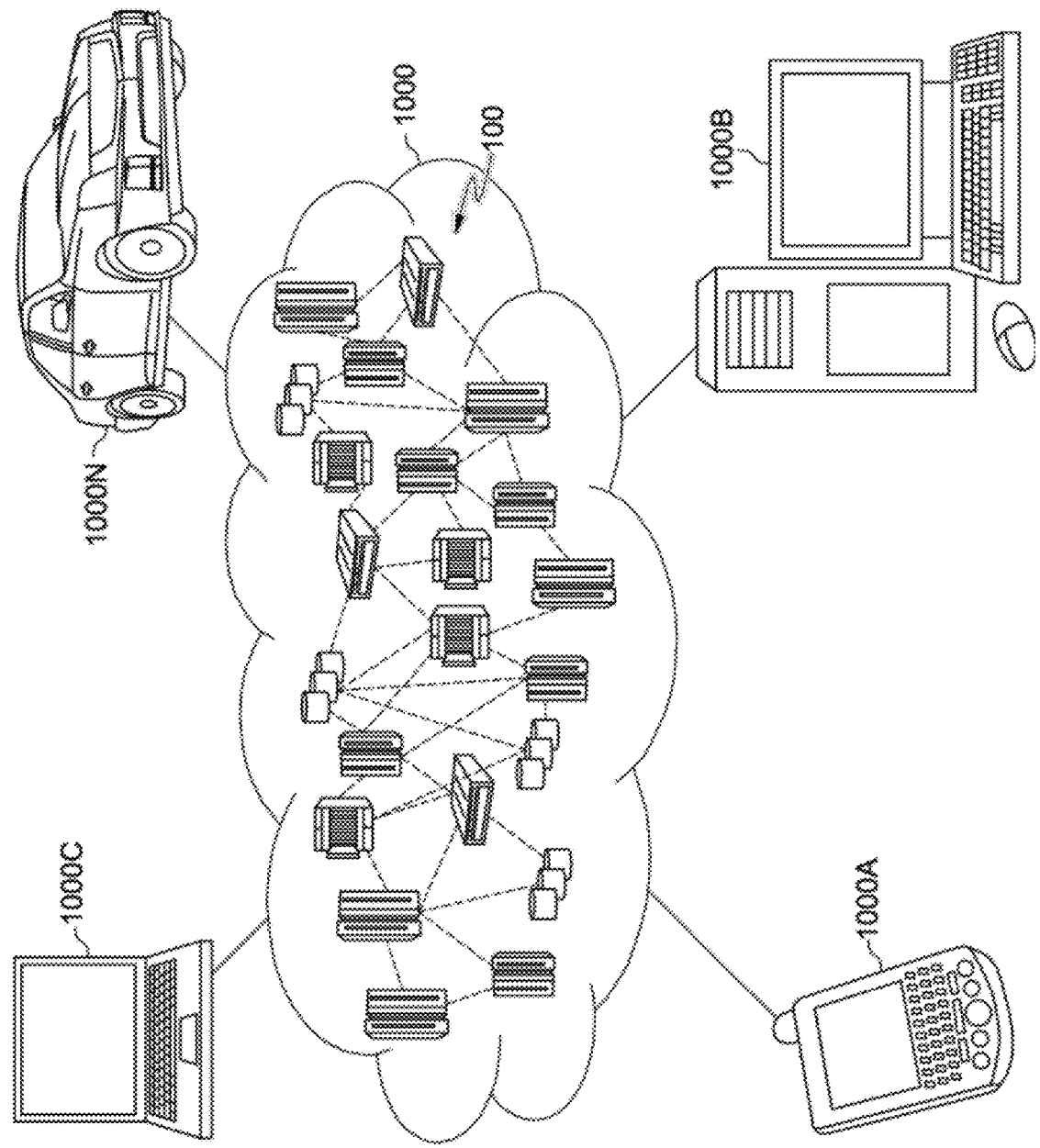
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
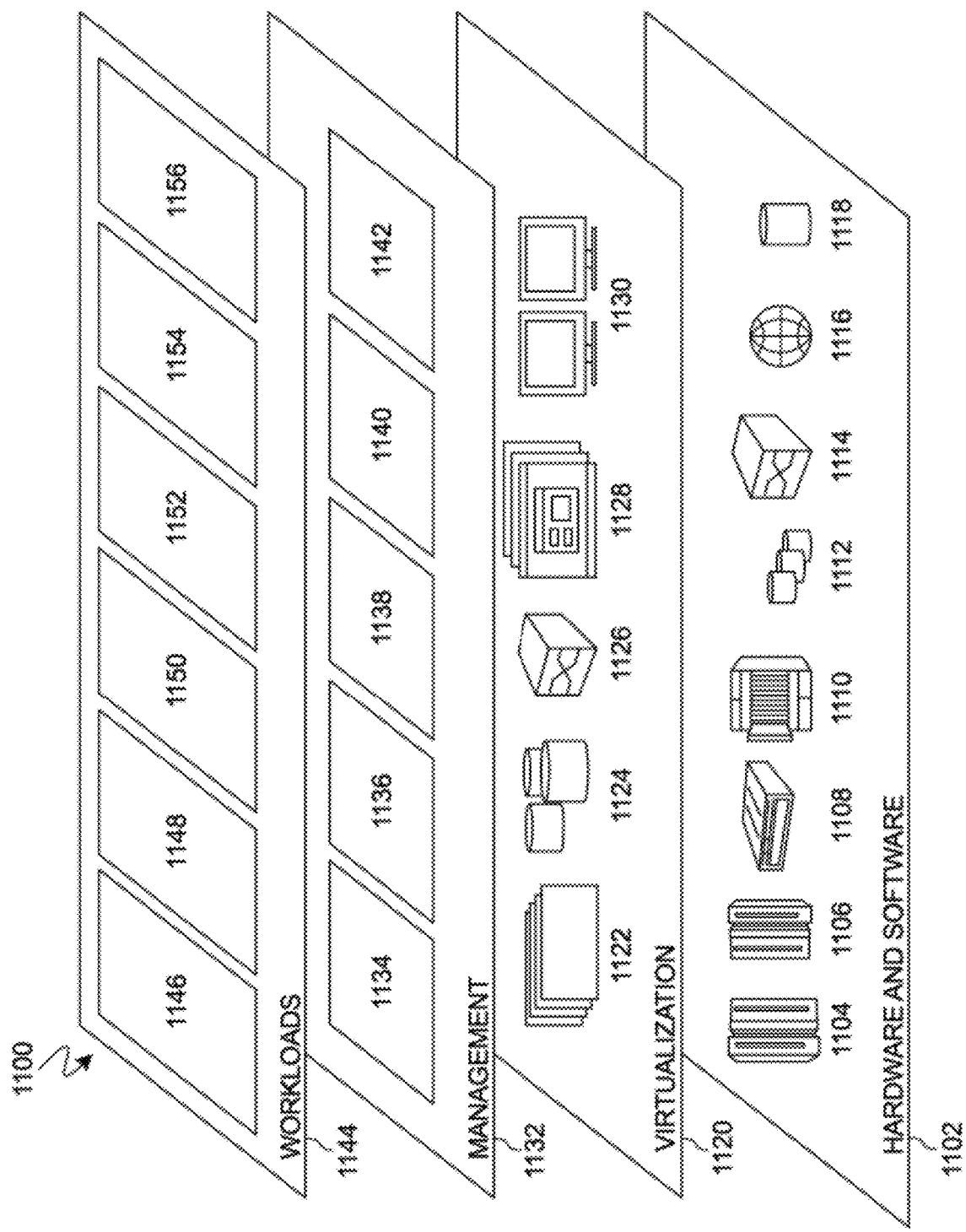
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and custom object 1156. An object customization program 110a, 110b provides a way to generate a custom object and to transform the custom object into an industry-based trend.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for artificial intelligence-based object customization, the method comprising:
   receiving, via a computer, a static list of previously determined objects associated with a place of purchase;
   extracting from the static list, via the computer, constituent components of the previously determined objects, the extracting comprising performing natural language processing techniques on the static list;
   finding, via an automated web search performed via the computer, an alternate for at least one of the constituent components;
   generating, via the computer, a recommendation for a first custom object based on the extracted constituent components, based on a saved profile of a first user, and based on the found alternate, the saved profile comprising a purchase history and preferences of the first user, the first custom object comprising a variation of at least one of the previously determined objects, the variation including the found alternate;
   generating, via the computer, a price for the recommended first custom object, the price being based on the extracted constituent components;

presenting, to the first user, the recommendation and the price for the first custom object;
in response to determining that the first user and the place of purchase enter into an agreement to the generated price for the first custom object, producing a series of instructions for the place of purchase to create the first custom object, the producing comprising:
organizing a graph comprising vertices and edges, the vertices representing a constituent component or a task, the edges capturing an order of each constituent component or task;
producing multiple subgraphs representing alternative ways of handling a first constituent component for the first custom object;
clustering the subgraphs to produce clusters by implementing a bisecting k-means algorithm, each cluster having a respective suitability score;
selecting, from the clusters, a first cluster with a highest suitability score of the suitability scores; and
including a sequence of the selected first cluster in the series of instructions.

2. The computer-implemented method of claim 1, further comprising:
browsing, by the first user, the static list of previously determined objects associated with the place of purchase.

3. The computer-implemented method of claim 1, further comprising:
in response to determining that the first custom object satisfies a popularity threshold, incorporating the first custom object into a list of large-scale industry-based trends.

4. The computer-implemented method of claim 1, wherein the extracting further comprises:
parsing the static list;
applying an ontology structure to the parsed static list; and
analyzing a title of each identified previously determined object and a description associated with each identified previously determined object on the parsed static list.

5. The computer-implemented method of claim 1, wherein the generating the price further comprises:
computing a preliminary price for the first custom object by:
generating a set of data associated with an average price for each of the constituent components needed for the first custom object, and
adding up the average price for each of the constituent components; and
computing a final price for the first custom object by applying a markup to the computed preliminary price.

6. The method of claim 1, wherein the producing the series of instructions further comprises utilizing at least one image search.

7. The method of claim 1, wherein the producing the series of instructions further comprises:
building a respective subgraph for each of the constituent components of the first custom object, and
merging the subgraphs to produce an instructions graph comprising high-level instructions to produce the first custom object.

8. The method of claim 1, wherein the clustering the subgraphs further comprises implementing a weighted graph edit distance.

9. The method of claim 1, wherein the first custom object comprises a piece of furniture.

10. The method of claim 1, wherein the first custom object comprises a piece of clothing.

11. The method of claim 1, further comprising:
determining a first popularity value for the first custom object, wherein the first popularity value is based on one or more of a number of orders of the first custom object within a period of time, a number of the first custom objects sold, an amount of revenue generated by the sale of the first custom object, and a profit generated by the sale of the first custom object;
in response to determining that the determined first popularity value satisfies a popularity threshold, adding the first custom object to the static list of the place of purchase.

12. The method of claim 1, wherein the respective suitability score is based at least in part on a number of the subgraphs in the respective cluster.

13. The method of claim 1, wherein the respective suitability score is weighted by a relevance of a respective subgraph to the constituent component.

14. A computer system for artificial intelligence-based object customization, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving a static list of previously determined objects associated with a place of purchase;
extracting, from the static list, constituent components of the previously determined objects, the extracting comprising performing natural language processing techniques on the static list;
finding, via an automated web search, an alternate for at least one of the constituent components;
generating a recommendation for a first custom object based on the extracted constituent components, based on a saved profile of a first user, and based on the found alternate, the saved profile comprising a purchase history and preferences of the first user, the first custom object comprising a variation of at least one of the previously determined objects, the variation including the found alternate;
generating a price for the recommended first custom object, the price being based on the extracted constituent components;
presenting, to the first user, the recommendation and the price for the first custom object;
in response to determining that the first user and the place of purchase enter into an agreement to the generated price for the first custom object, producing a series of instructions for the place of purchase to create the first custom object, the producing comprising:
organizing a graph comprising vertices and edges, the vertices representing a constituent component or a task, the edges capturing an order of each constituent component or task;
producing multiple subgraphs representing alternative ways of handling a first constituent component for the first custom object;
clustering the subgraphs to produce clusters by implementing a bisecting k-means algorithm, each cluster having a respective suitability score;
selecting, from the clusters, a first cluster with a highest suitability score of the suitability scores; and including a sequence of the selected first cluster in the series of instructions.

15. The computer system of claim 14, wherein the method further comprises:
in response to determining that the first custom object satisfies a popularity threshold, incorporating the first custom object into a list of large-scale industry-based trends.

16. The computer system of claim 14, wherein the producing the series of instructions further comprises utilizing at least one image search.

17. A computer program product for artificial intelligence-based object customization, the computer program product comprising:
one or more tangible computer-readable storage media and program instructions stored on at least one of the one or more tangible computer-readable storage media, the program instructions executable by a processor to cause the processor to perform a method comprising:
receiving a static list of previously determined objects associated with a place of purchase;
extracting, from the static list, constituent components of the previously determined objects;
finding, via an automated web search, an alternate for at least one of the constituent components;
generating a recommendation for a first custom object based on the extracted constituent components, based on a saved profile of a first user, and based on the found alternate, the saved profile comprising a purchase history and preferences of the first user, the first custom object comprising a variation of at least one of the previously determined objects, the variation including the found alternate;
generating a price for the recommended first custom object, the price being based on the extracted constituent components;
presenting, to the first user, the recommendation and the price for the first custom object;
in response to determining that the first user and the place of purchase enter into an agreement to the generated price for the first custom object, producing a series of instructions for the place of purchase to create the first custom object, the producing comprising:
organizing a graph comprising vertices and edges, the vertices representing a constituent component or a task, the edges capturing an order of each constituent component or task;
producing multiple subgraphs representing alternative ways of handling a first constituent component for the first custom object;
clustering the subgraphs to produce clusters by implementing a bisecting k-means algorithm, each cluster having a respective suitability score;
selecting, from the clusters, a first cluster with a highest suitability score of the suitability scores; and
including a sequence of the selected first cluster in the series of instructions.

18. The computer program product of claim 17, wherein the method further comprises:
in response to determining that the first custom object satisfies a popularity threshold, incorporating the first custom object into a list of large-scale industry-based trends.

19. The computer program product of claim 17, wherein the extracting further comprises:
parsing the static list;
applying an ontology structure to the parsed static list; and
analyzing a title of each identified previously determined object and a description associated with each identified previously determined object on the parsed static list.

20. The computer program product of claim 17, wherein the clustering the subgraphs further comprises implementing a weighted graph edit distance.

* * * * *